(12) United States Patent
Brackett, Sr.

(10) Patent No.: US 9,497,950 B2
(45) Date of Patent: Nov. 22, 2016

(54) BEACON LIGHT FOR FREE FLOATING FISHING DEVICE

(71) Applicant: Jerk-It, LLC, Bokoshe, OK (US)

(72) Inventor: Paul E. Brackett, Sr., Van Buren, AR (US)

(73) Assignee: Jerk-It, LLC, Bokoshe, OK (US)

( * ) Notice: Subject to any disclaimer, the term of this patent is extended or adjusted under 35 U.S.C. 154(b) by 182 days.

(21) Appl. No.: 14/550,599

(22) Filed: Nov. 21, 2014

(65) Prior Publication Data

US 2016/0146449 A1    May 26, 2016

(51) Int. Cl.
 *A01K 93/02*    (2006.01)
 *F21L 4/00*    (2006.01)
 *F21V 33/00*    (2006.01)

(52) U.S. Cl.
 CPC ............... *A01K 93/02* (2013.01); *F21L 4/00* (2013.01); *F21V 33/008* (2013.01)

(58) Field of Classification Search
 CPC .......... A01K 93/02; F21L 4/00; F21V 15/01; F21V 23/06; F21V 33/008
 See application file for complete search history.

(56) References Cited

U.S. PATENT DOCUMENTS

| 2,153,750 A | * | 4/1939 | Goertzen | ............... | A01K 93/02 43/17 |
| 5,119,578 A | * | 6/1992 | Johnson | ................. | A01K 93/02 43/17 |
| 5,615,512 A | * | 4/1997 | Wang | ..................... | A01K 93/02 43/17 |

* cited by examiner

*Primary Examiner* — Stephen F Husar
(74) *Attorney, Agent, or Firm* — Crowe & Dunlevy, P.C.

(57) ABSTRACT

A beacon light for a free floating fishing device having a transparent or translucent upper housing slidably engaged and friction fit with a lower base. The lower base is configured to be removably or permanently attached to the free floating fishing device. A lighting assembly is housed within the upper housing, and the lighting assembly includes a power source in electrical communication with a light source. A conductive biasing linkage, such as a compression spring, is housed within the upper housing and configured to be in electrical contact between the power source and the light source. The upper housing, the lighting assembly, and the lower base are in coaxial and concentric alignment. The lower base is configured to contact the conductive biasing linkage to complete the path of an electrical circuit between the power supply, the biasing linkage and the light source in order to selectively energize the light source.

20 Claims, 3 Drawing Sheets

BEACON LIGHT FOR FREE FLOATING FISHING DEVICE

CROSS-REFERENCE TO RELATED APPLICATIONS

Not applicable.

BACKGROUND OF THE INVENTION

1. Field of the Invention

This invention relates to a beacon light for a free floating fishing device.

2. Description of the Related Art

During the sport of fishing, it is essential to react to a fish's bite on the bait of the hook in order to set the hook in the mouth of the fish, thereby catching the fish. Under certain circumstances, such as with an unexperienced fisherman or when the fish bites quickly or almost unbeknownst to the fisherman, the fisherman misses their opportunity to set the hook in the mouth of the fish before the fish gets away. Moreover, fishing at night is difficult because the fisherman cannot see the free floating fishing device or other floater.

Therefore, it is desirable to provide a beacon light for a free floating fishing device.

Other advantages and features will be apparent from the following description, and from the claims.

BRIEF SUMMARY OF THE INVENTION

In general, the invention relates to a beacon light for a free floating fishing device. The beacon light has a transparent or translucent upper housing slidably engaged and friction fit with a lower base. The upper housing has a lighting assembly cavity with an internal stop shoulder. A base footing of the lower base is configured to be removably or permanently attached to the free floating fishing device. The lower base has an upstanding outer wall portion forming a base cavity having a medial protuberance therein. The beacon light also includes a lighting assembly housed within the upper housing. The lighting assembly includes a power source in electrical communication with a light source. The power source can be coin cell batteries, and the light source can be a light-emitting diode. The light source has a negative lead in electrical contact with a negative side of the power source. A positive lead of the light source is in electrical contact with a conductive biasing linkage, such as a compression spring, housed within the upper housing. The conductive biasing linkage is configured to be in electrical contact with a positive side of the power source. In addition, the biasing linkage is in contact with the stop shoulder of the lighting assembly cavity of the upper housing.

The upper housing, the lighting assembly, and the lower base are in coaxial and concentric alignment. The medial protuberance of the lower base is configured to contact the conductive biasing linkage to complete the path of an electrical circuit between the positive side of the power supply, the biasing linkage and the positive lead of the light source in order to selectively energize the light source.

Moreover, the beacon light can include a lighting assembly armature received within the lighting assembly cavity of the upper housing. The armature includes a light source cavity for receipt of the light source and a power source cavity for receipt of the power source. The conductive biasing linkage or compression spring is positioned about an outer diameter of the armature with a portion of the positive lead of the light source positioned between the armature and the conductive linkage. Additionally, the upper housing, the lighting assembly, the lighting assembly armature, and the lower base are in coaxial and concentric alignment.

DETAILED DESCRIPTION OF THE INVENTION

Figure 1:
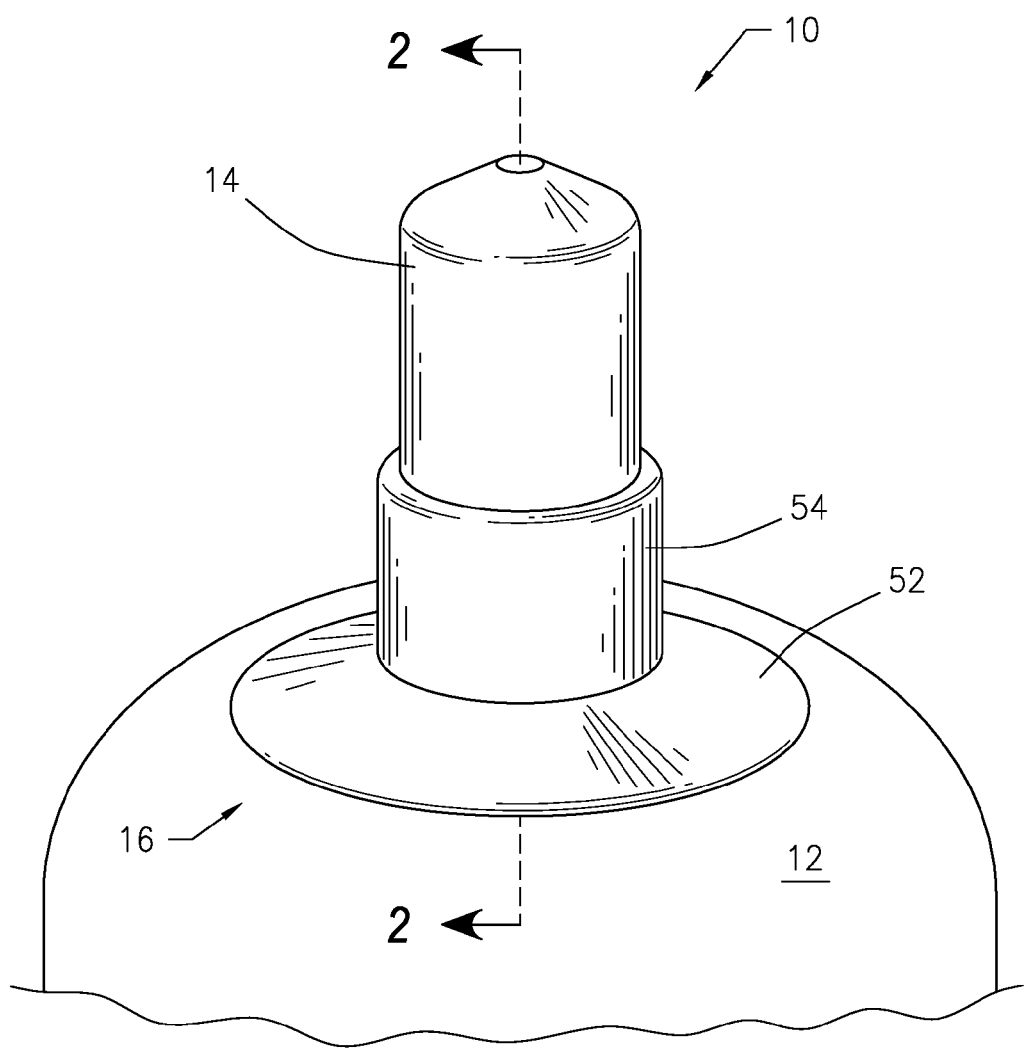
FIG. 1 is a perspective view of an example of a beacon light for a free floating fishing device in accordance with an illustrative embodiment of the invention disclosed herein.

The devices and methods discussed herein are merely illustrative of specific manners in which to make and use this invention and are not to be interpreted as limiting in scope.

While the invention has been described with a certain degree of particularity, it is to be noted that many modifications may be made in the construction and the arrangement of the structural and function details disclosed herein without departing from the scope of the invention. It is understood that the invention is not limited to the embodiments set forth herein for purposes of exemplification.

The description of the invention is intended to be read in connection with the accompanying drawings, which are to be considered part of the entire written description of this invention. In the description, relative terms such as "front," "rear," "lower," "upper," "horizontal," "vertical," "above," "below," "up," "down," "top" and "bottom" as well as derivatives thereof (e.g., "horizontally," "downwardly," "upwardly" etc.) should be construed to refer to the orientation as then described or as shown in the drawings under discussion. These relative terms are for convenience of description and do not require that the machine be constructed or the method to be operated in a particular orientation. Terms, such as "connected," "connecting," "attached," "attaching," "join" and "joining" are used interchangeably and refer to one structure or surface being secured to another structure or surface or integrally fabricated in one piece.

Figure 2A:
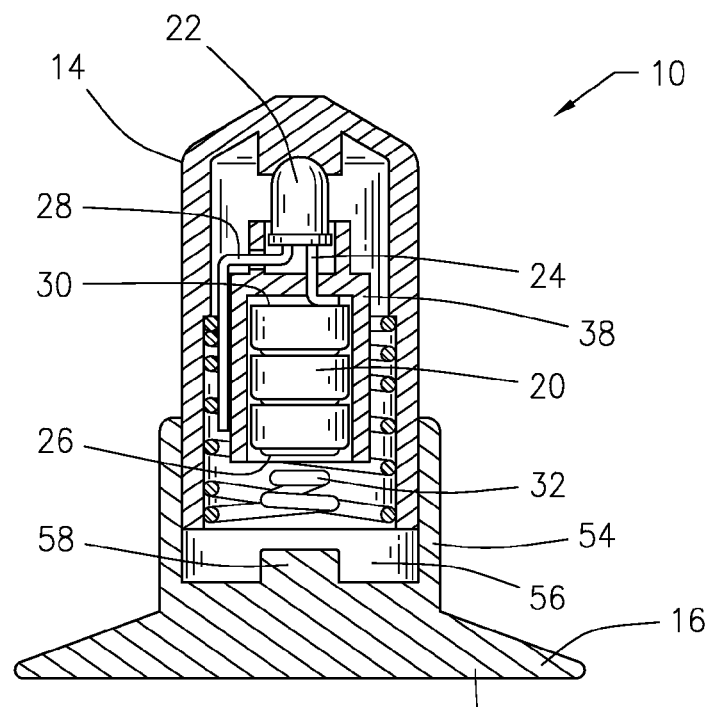
FIG. 2A is a cross-sectional view along line 2-2 of the beacon light shown in FIG. 1 in an unlit state.
Figure 2B:
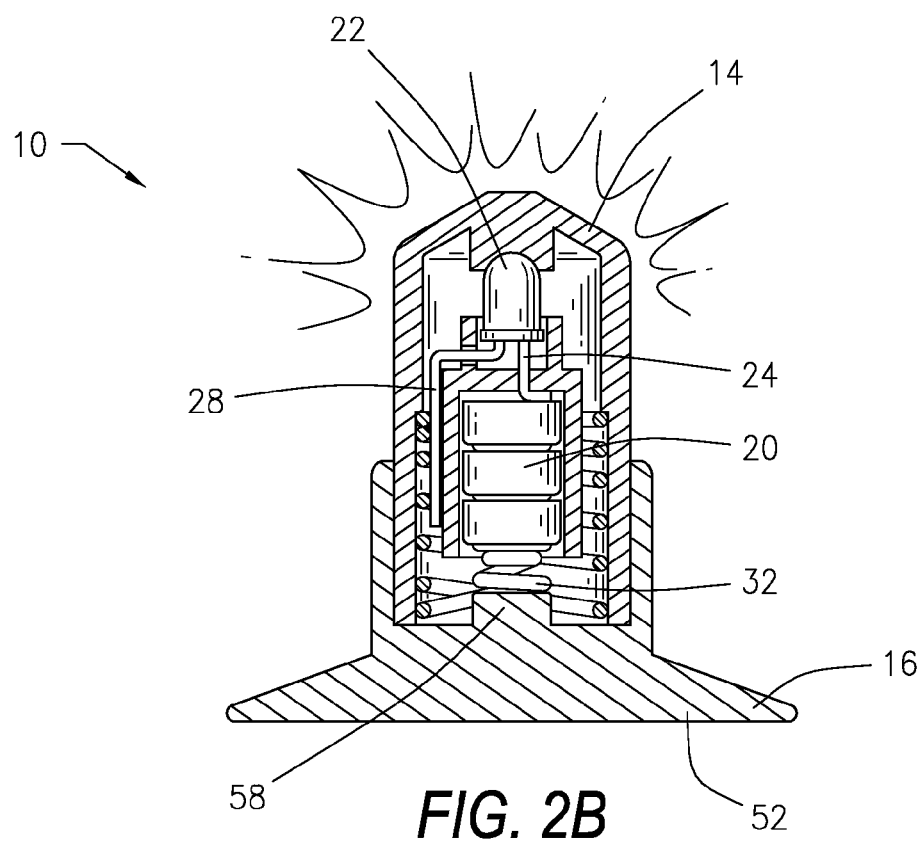
FIG. 2B is a cross-sectional view along line 2-2 of the beacon light shown in FIG. 1 in a lit state.
Figure 3:
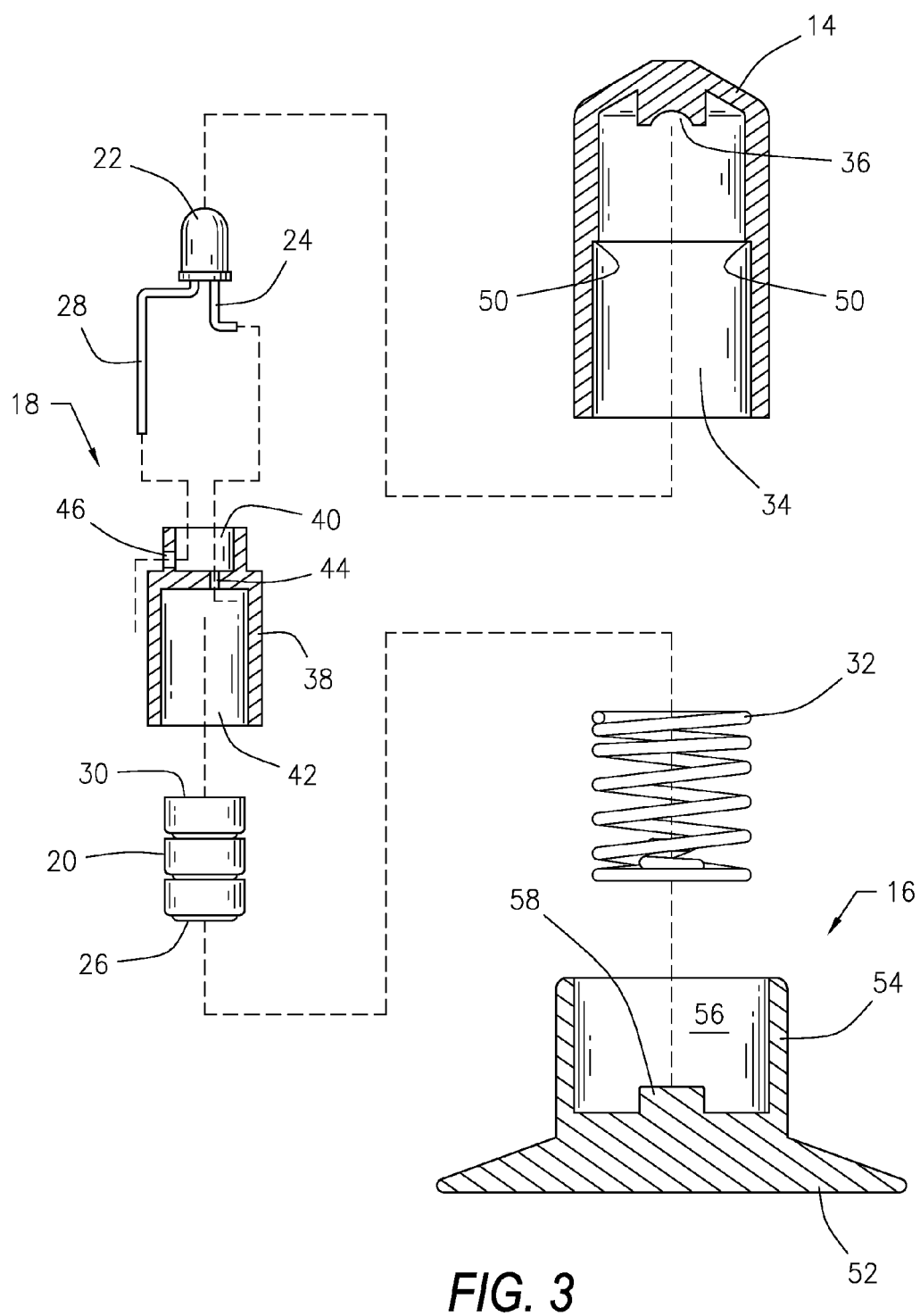
FIG. 3 is an exploded view of the beacon light shown in FIG. 1.

Referring now to the figures of the drawings, wherein like numerals of reference designate like elements throughout the several views, the invention relates to a beacon light 10 for a free floating fishing device 12. The beacon light 10 includes a translucent or transparent upper housing 14 that is slidably engaged and friction fit with a lower base 16. The lower base 16 is removably or permanently attached to a top end of the free floating fishing device 12 using a suitable fastener (not shown). The beacon light 10 is toggled between an unlit state illustrated in FIG. 2A and a lit state illustrated in FIG. 2B by actuating the upper housing 14 in relation to the lower base 16.

The beacon light 10 also includes a lighting assembly 18 having a power source 20 in electrical communication with a light source 22. The light source 22 has a negative lead 24 in electrical contact with a negative side 26 of the power source 20. The light source 22 has a positive lead 28 that is in electrical contact with a positive side 30 of the power source 20 via a conductive biasing linkage 32. The power source 20 may be a plurality of coin cell batteries (e.g., 1.5 volt), and the light source 22 may be a light-emitting diode. The biasing linkage 32 may be a compression spring.

The upper housing 14 of the beacon light 10 includes a lighting assembly cavity 34 having a light source pocket 36 for receipt of the light source 22. A lighting assembly armature 38 is received within the lighting assembly cavity 34 of the upper housing 14. The armature 38 includes a light source cavity 40 for receipt of the light source 22 and a power source cavity 42 for receipt of the power source 20. In addition, the armature 38 includes a negative lead aperture 44 through which the negative lead 24 is fed through between the light source cavity 40 and the power source cavity 42. The light source cavity 40 also includes a positive lead aperture 46 which the positive lead 28 is fed through in order to make electrical contact with the conductive biasing linkage 32. Moreover, the biasing linkage 32 is positioned about an outer diameter of the armature 38 with the positive lead 28 positioned intermediate of the armature 38 and the biasing linkage 32, and the biasing linkage 32 contacts a stop shoulder 50 within the lighting assembly cavity 34 of the upper housing 14.

The lower base 16 of the beacon light 10 includes a base footing 52 that is attached to the fishing device 12. The lower base 16 also includes an upstanding outer wall portion 54 forming a base cavity 56 having a medial protuberance 58 therein. The medial protuberance 58 is in contact with the biasing linkage 32 in order to make electrical contact between the positive side 26 of the power supply 20, the biasing linkage 32 and the positive lead 28 thereby completing the circuit in order to energize the light source 22 in the lit state shown in FIG. 2B.

When the beacon light 10 is assembled, the upper housing 14, the lighting assembly 18, the lighting assembly armature 38, and the lower base 16 are in coaxial and concentric alignment. By moving the upper housing 14 downward toward the lower base 16, the conductive biasing linkage 32 comes into electrical contact with the positive side 26 of the power source 20 thereby completing the electrical circuit for activation of the light source 22. Similarly, by moving the upper housing 14 away from the lower base 16, the electrical circuit between the power source 20 and the light source 22 is interrupted as the conductive biasing linkage 32 is no longer in electrical contact with the positive side 26 of the power source 20.

Whereas, the invention has been described in relation to the drawings and claims, it should be understood that other and further modifications, apart from those shown or suggested herein, may be made within the scope of this invention.

What is claimed is:

1. A beacon light for a free floating fishing device, said beacon light comprising:
    a upper housing slidably engaged and friction fit with a lower base, said upper housing comprising a lighting assembly cavity;
    said lower base configured to be removably or permanently attached to said free floating fishing device, and said lower base comprising a base cavity having a medial protuberance therein;
    a lighting assembly housed within said upper housing, said lighting assembly comprising a power source in electrical communication with a light source; said light source having a negative lead and a positive lead; said negative lead of said light source in electrical contact with a negative side of said power source; and
    a conductive biasing linkage housed within said upper housing, said biasing linkage in electrical contact with said positive lead of said light source, said biasing linkage configured to be in electrical contact with a positive side of said power source;
    wherein said upper housing, said lighting assembly, and said lower base are in coaxial and concentric alignment, and wherein said medial protuberance of said lower base is configured to contact said biasing linkage to complete the path of an electrical circuit between said positive side of said power supply, said biasing linkage and said positive lead of said light source in order to selectively energize said light source.

2. The beacon light of claim 1 wherein said upper housing is transparent or translucent.

3. The beacon light of claim 1 wherein said power source comprises a plurality of coin cell batteries.

4. The beacon light of claim 1 wherein said light source comprises a light-emitting diode.

5. The beacon light of claim 1 wherein said biasing linkage comprises a compression spring.

6. The beacon light of claim 1 wherein said upper housing further comprises said lighting assembly cavity having a light source pocket for receipt of said light source.

7. The beacon light of claim 1 further comprising a lighting assembly armature received within said lighting assembly cavity of said upper housing.

8. The beacon light of claim 7 wherein said armature comprises a light source cavity for receipt of said light source and a power source cavity for receipt of said power source.

9. The beacon light of claim 8 wherein said armature further comprises a negative lead aperture through which said negative lead of said light source is fed through between said light source cavity and said power source cavity.

10. The beacon light of claim 8 wherein said light source cavity further comprises a positive lead aperture through which said positive lead is fed through in order to make electrical contact with said conductive biasing linkage.

11. The beacon light of claim 7 wherein said biasing linkage is positioned about an outer diameter of said armature with a portion of said positive lead of said light source positioned between said armature and said biasing linkage.

12. The beacon light of claim 11 wherein said upper housing, said lighting assembly, said lighting assembly armature, and said lower base are in coaxial and concentric alignment.

13. The beacon light of claim 1 wherein said biasing linkage is in contact with a stop shoulder within said lighting assembly cavity of said upper housing.

14. The beacon light of claim 1 wherein said lower base further comprises a base footing configured to be attached to said fishing device.

15. The beacon light of claim 1 wherein said lower base further comprises an upstanding outer wall portion forming said base cavity having said medial protuberance therein.

16. A beacon light for a free floating fishing device, said beacon light comprising:
    a transparent or translucent upper housing slidably engaged and friction fit with a lower base, said upper housing comprising a lighting assembly cavity having an internal stop shoulder;
    a base footing of said lower base configured to be removably or permanently attached to said free floating fishing device, said lower base comprising an upstanding outer wall portion forming a base cavity having a medial protuberance therein;
    a lighting assembly housed within said upper housing, said lighting assembly comprising a power source in electrical communication with a light source; said light source having a negative lead and a positive lead; said negative lead of said light source in electrical contact with a negative side of said power source; and a conductive compression spring housed within said upper housing, said conductive compression spring in electrical contact with said positive lead of said light source, said conductive compression spring configured to be in electrical contact with a positive side of said power source, said conductive compression spring in contact with said stop shoulder of said lighting assembly cavity of said upper housing;

wherein said upper housing, said lighting assembly, and said lower base are in coaxial and concentric alignment, and wherein said medial protuberance of said lower base is configured to contact said conductive compression spring to complete the path of an electrical circuit between said positive side of said power supply, said compression spring and said positive lead of said light source in order to selectively energize said light source.

17. The beacon light of claim 16 further comprising a lighting assembly armature received within said lighting assembly cavity of said upper housing.

18. The beacon light of claim 17 wherein said armature comprises a light source cavity for receipt of said light source and a power source cavity for receipt of said power source.

19. The beacon light of claim 17 wherein said conductive compression spring is positioned about an outer diameter of said armature with a portion of said positive lead of said light source positioned between said armature and said conductive compression spring.

20. The beacon light of claim 17 wherein said upper housing, said lighting assembly, said lighting assembly armature, and said lower base are in coaxial and concentric alignment.

* * * * *